(12) United States Patent
Madge et al.

(10) Patent No.: US 8,147,183 B2
(45) Date of Patent: Apr. 3, 2012

(54) DRIVETRAIN FOR GENERATOR IN WIND TURBINE

(75) Inventors: James Henry Madge, Simpsonville, SC (US); Priyangu Chunilal Patel, Simpsonville, SC (US); Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/981,652

(22) Filed: Dec. 30, 2010

(65) Prior Publication Data

US 2011/0211962 A1 Sep. 1, 2011

(51) Int. Cl.
*F03D 11/02* (2006.01)
(52) U.S. Cl. .................. 415/124.1; 416/160; 290/44
(58) Field of Classification Search .......... 415/124.1; 416/160; 290/43, 44, 54, 55
See application file for complete search history.

(56) References Cited

U.S. PATENT DOCUMENTS

| | | | |
|---|---|---|---|
| 4,239,977 A * | 12/1980 | Strutman | 290/44 |
| 6,459,165 B1 * | 10/2002 | Schoo | 290/1 C |
| 7,008,348 B2 | 3/2006 | LaBath | |
| 7,083,378 B2 * | 8/2006 | Hur | 415/4.3 |
| 7,259,472 B2 | 8/2007 | Miyake et al. | |
| 7,360,310 B2 | 4/2008 | Bagepalli et al. | |
| 7,538,446 B2 | 5/2009 | Bonnet | |
| 7,621,843 B2 | 11/2009 | Madge et al. | |
| 7,753,817 B2 | 7/2010 | Ryymin et al. | |
| 2009/0058094 A1 | 3/2009 | Jansen et al. | |
| 2010/0009799 A1 | 1/2010 | Ciszak et al. | |
| 2010/0113210 A1 | 5/2010 | Lopez et al. | |
| 2010/0133854 A1 | 6/2010 | Jansen et al. | |

* cited by examiner

*Primary Examiner* — Edward Look
*Assistant Examiner* — Dwayne J White
(74) *Attorney, Agent, or Firm* — James W. Pemrick; Ernest G. Cusick; Frank A. Landgraff

(57) ABSTRACT

A wind turbine and a drivetrain for a generator is provided. The drivetrain includes a hub configured to provide an input rotational speed, and a planetary gearbox in communication with the hub. The planetary gearbox includes a stationary or rotatable carrier and a plurality of planet gears. The planetary gearbox is configured to convert the input rotational speed to an output rotational speed, and includes at least one sun gear. The hub can be rigidly connected to the rotatable ring gear.

8 Claims, 3 Drawing Sheets

DRIVETRAIN FOR GENERATOR IN WIND TURBINE

FIELD OF THE INVENTION

The present disclosure relates in general to wind turbines, and more particularly to drivetrains for generators in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture the kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of the wind turbine, many various loads may be experienced by various components of the wind turbine. In particular, the drivetrain, which may include the shaft, gearbox, generator, and various components thereof, may experience various loads. These loads may be experienced due to wind loading of the rotor blades. The loads experienced by the rotor blades may be transmitted from the rotor blades to these various components.

For example, during operation, axial loads may be experienced by the shaft due to, for example, the thrust of the rotor blades. These axial loads can be transmitted from the shaft to the bearings surrounding and supporting the shaft, and to the gearbox connected to the shaft. Exposure to these axial loads can stress the bearings and gearbox and potentially cause premature failure of these components.

Further, during operation, bending loads may be experienced by the shaft due to, for example, wind gusts that affect the rotor blades. These bending loads can be transmitted from the shaft to the gearbox connected to the shaft. Exposure to these bending loads can stress the gearbox and potentially cause premature failure of various components of the gearbox.

BRIEF DESCRIPTION OF THE INVENTION

Aspects and advantages of the invention will be set forth in part in the following description, or may be obvious from the description, or may be learned through practice of the invention.

In one aspect of the invention, a drivetrain for a generator in a wind turbine is provided. The drivetrain includes a hub configured to provide an input rotational speed, and a planetary gearbox in communication with the hub. The planetary gearbox includes a stationary carrier and a plurality of rotatable gears. The planetary gearbox is configured to convert the input rotational speed to an output rotational speed, and includes a rotatable ring gear, a plurality of planet gears and at least one sun gear. The hub is rigidly connected to the rotatable ring gear.

In another aspect of the invention, a drivetrain for a generator in a wind turbine is provided. The drivetrain includes a hub configured to provide an input rotational speed, and a planetary gearbox in communication with the hub. The planetary gearbox includes a rotatable carrier, and is configured to convert the input rotational speed to an output rotational speed. The planetary gearbox includes a stationary ring gear, a plurality of planet gears and at least one sun gear. The hub is rigidly connected to the rotatable carrier, and the rotatable carrier supports the plurality of planet gears.

In a still further aspect of the present invention, a wind turbine having a drivetrain for a generator is provided. The wind turbine includes a nacelle supported by a tower, a hub connected to one or more rotor blades, where the hub is configured to provide an input rotational speed. The wind turbine also includes a planetary gearbox in communication with the hub, and the planetary gearbox includes a planet carrier and a plurality of planet gears. The planetary gearbox is configured to convert the input rotational speed to an output rotational speed, and includes a ring gear, a plurality of planet gears and at least one sun gear. The hub is rigidly connected to at least one of the planet carrier and the ring gear.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
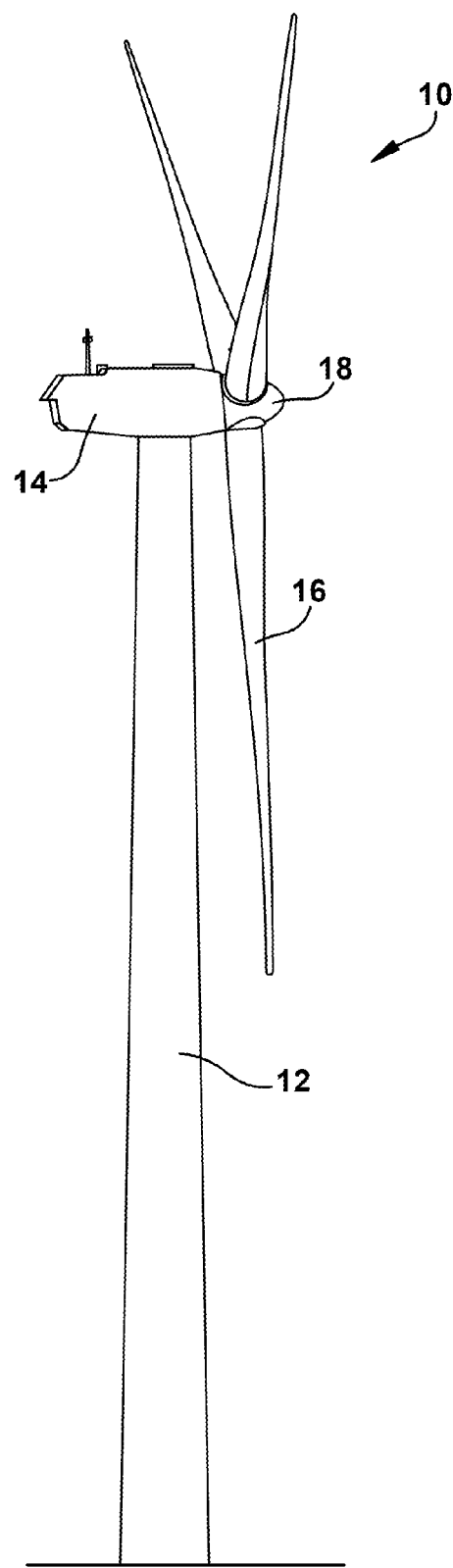
FIG. 1 is an illustration of a perspective view of a wind turbine according to one aspect of the present invention.

Reference now will be made in detail to aspects of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one aspect can be used with another aspect to yield a still further aspect. Thus, it is intended that the present invention covers such modifications and variations as come within the scope of the appended claims and their equivalents.

FIG. 1 illustrates a wind turbine 10 that includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

The hub 18 may be configured to accept the rotor blades 16 thereon. For example, the hub 18 may include a plurality of blade flanges (not shown). The blade flanges may be configured to engage mating flanges (not shown) on the rotor blades 16 to mount the rotor blades 16 to the flanges, and thus to the hub 18.

Figure 2:
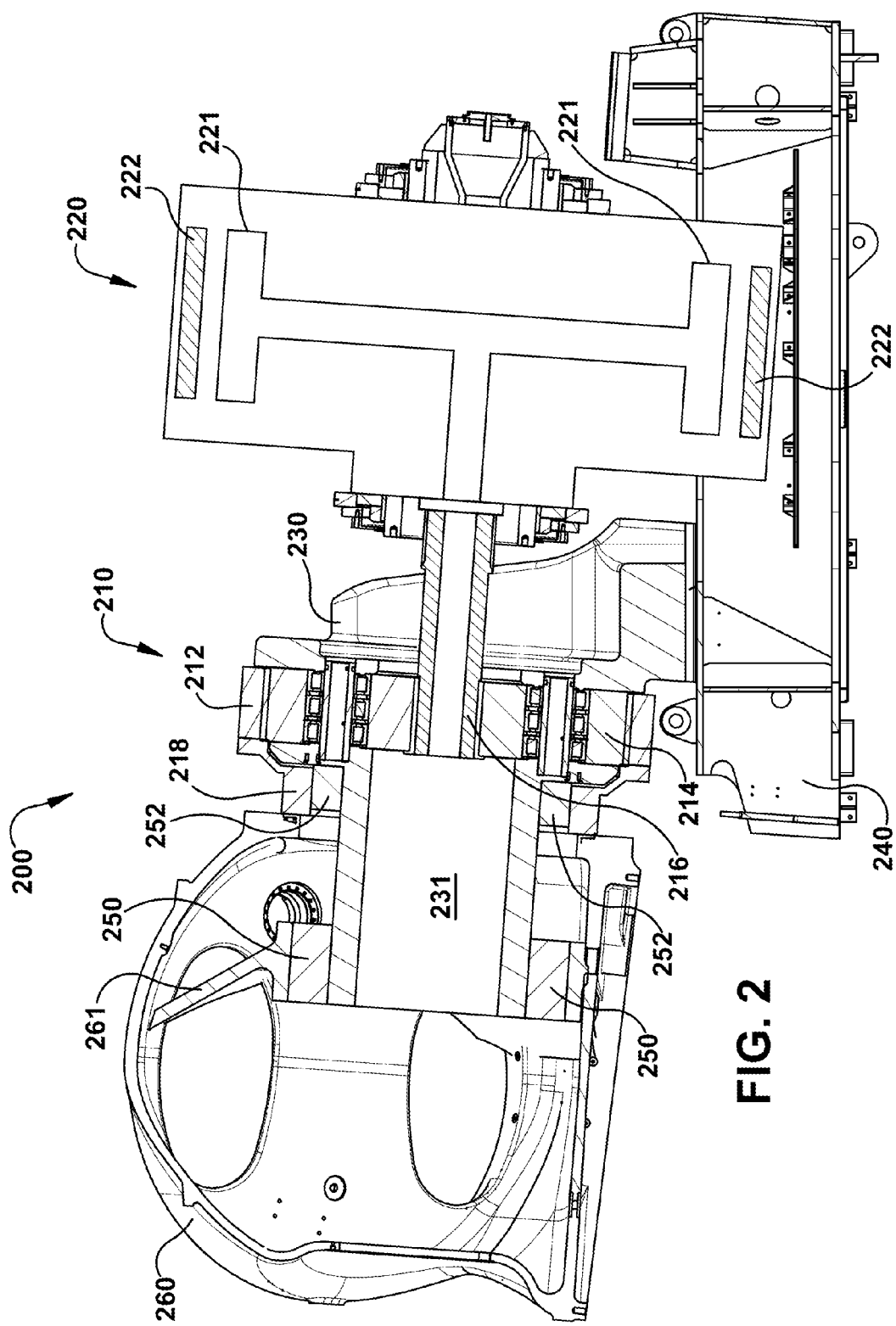
FIG. 2 is an illustration of a partial cross-sectional view of a drivetrain for a generator in a wind turbine according to one aspect of the present invention.

FIG. 2 illustrates a drivetrain 200 for a wind turbine, according to an aspect of the present invention. The drivetrain 200 may be configured as a single stage gear box 210 which is used to reduce torque supplied to a generator 220. The planet carrier 230 is stationary and is rigidly connected to the main support frame 240. A spindle 231 on the planet carrier 230 extends axially upwind or forward, and is paired with bearings 250, 252 that are used to support the rotor. A ring gear 212 attached to the hub 260 drives the planet gears 214 when the hub 260 rotates, this in turn drives a sun gear/pinion 216 providing a speed increase and perceived torque reduction.

The generator 220 may be disposed in the nacelle 14. The generator 220 may be configured to accept mechanical energy from the rotor blades 16 and hub 18 and convert this energy to electrical energy. For example, the generator 220 may include a rotor 221 and a stator 222. As is known in the art, the rotor 221 is a generally movable component of the generator 220, while the stator 222 is a generally stationary component of the generator 220. The generator 220 in exemplary embodiments may be a permanent magnet generator. However, it should be understood that the generator 220 is not limited to permanent magnet generators, and rather that any generator suitable for powering a wind turbine 10 is within the scope and spirit of the present invention.

In general, the rotor blades 16 may be configured to rotate the rotor 221 of the generator 220. Thus, the generator 220, such as the rotor 221, may be operably connected to the hub 260. Operation of the rotor blades 16 rotates the hub 260, which rotates the rotor 221 and thus operates the generator 220. Thus, a drivetrain 200 for the generator 220 may be provided between the hub 260 and the rotor 221 to provide the operable connection between the hub 260 and the rotor 221.

The hub 260 is supported by the spindle 231 of the planet carrier 230. A front bearing 250 and a rear bearing 252 are located between the hub 260 and spindle 231. A hub support member 261 extends from the shell of the hub to the front bearing 250. Multiple support members 261 can be used for supporting the hub 260 on front bearing 250. A coupling 218, joining the hub 260 to the ring gear 212, can be used to support the rear portion of the hub. Alternatively, the rear portion of the hub 260 could be in contact with rear bearing 252. The bearings 250, 252 may be roller bearings, tapered roller bearings, thrust bearings or any other suitable bearing as desired for the specific application. The carrier 230 is secured to the main support frame 240, and functions as a support for the weight of the rotor (including blades 18 and hub 260) as well as the gearbox 210.

The hub 260 is coupled to ring gear 212 via coupling 218. Coupling 218 can be an interface member or can be an integral piece of hub 260. As the hub 260 rotates, the ring gear 212 also rotates and drives the planet gears 214. The planet gears 214 in turn drive the sun gear or shaft 216. The sun shaft 216 can then be coupled to the generator rotor 221 by any suitable coupling (e.g., spline fit coupling, bolted flange, etc.).

There are several advantages to this configuration. The gearbox size can be reduced, and the gearbox is one of the most expensive components in a wind turbine. Since the hub 260 is supported directly by the stationary carrier 230, only torsional shear loads are transferred by a rotating shaft. In a typical drive train the main shaft transmits torque and supports the weight of the rotor. Since the carrier that supports the hub is stationary it does not experience rotating bending as in a typical shaft. The rotor can be supported by nodular iron as opposed to alloy steel. This design allows the use of a smaller torque transmission shaft and smaller generator since the torque from the rotor is reduced by the single stage gear box 210. This design has advantages over a traditional gearbox because the design is for a single stage, which should provide higher reliability and less friction loss when compared with a multi-stage gearbox. Another advantage is provided by having a separate rotor support from the torque transmission function. This can also reduce rotating bending in the drivetrain. Coupling 218 transfers torque to the ring gear 212 and is designed to reduce rotor bending load transfer to ring gear 212. The coupling 218 can be designed to be torsionally stiff but flexible in bending.

Figure 3:
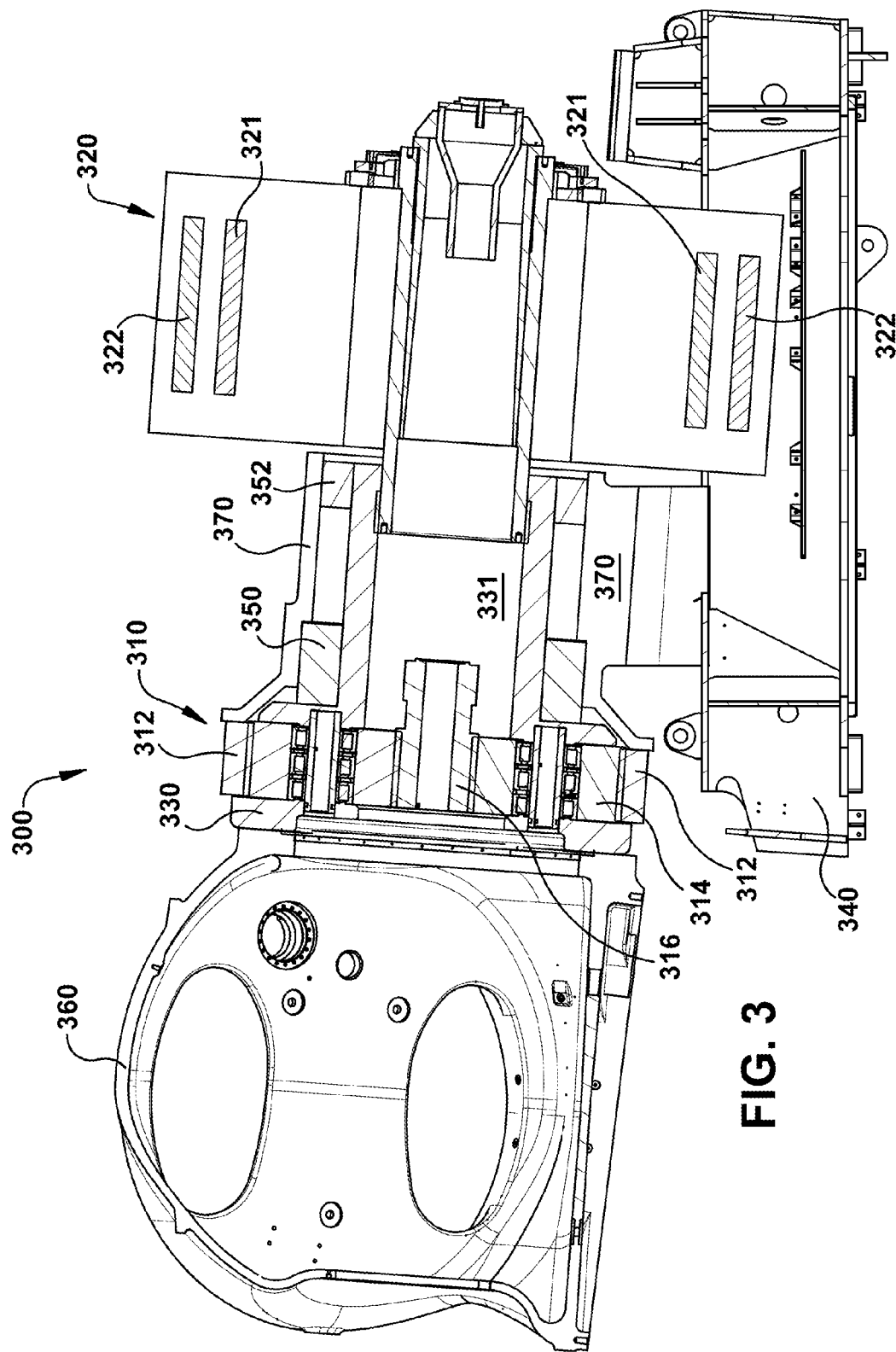
FIG. 3 is an illustration of a partial cross-sectional view of a drivetrain for a generator in a wind turbine according to one aspect of the present invention.

FIG. 3 illustrates a drivetrain 300 for a wind turbine, according to another aspect of the present invention. The drivetrain 300 may be configured as a single stage gear box 310 which is used to reduce torque supplied to a generator 320. The planet carrier 330 is rigidly connected to the hub 360. A spindle 331 on the planet carrier 330 extends axially downwind or rearward, and is paired with bearings 350, 352 that are used to support the rotor and gearbox 310. A ring gear 312 is attached to outer support housing 370. The hub 360 drives the planet gear carrier 330 when the hub 360 rotates, this in conjunction with the fixed ring gear 312 drives the planet gears 314, and the planet gears 314 in turn drive a sun gear/pinion 316 providing a speed increase and perceived torque reduction.

The generator 320 may be disposed in the nacelle 14. The generator 320 may be configured to accept mechanical energy from the rotor blades 16 and hub 18 and convert this energy to electrical energy. For example, the generator 320 may include a rotor 321 and a stator 322. As is known in the art, the rotor 321 is a generally movable component of the generator 320, while the stator 322 is a generally stationary component of the generator 320. The generator 320 in exemplary embodiments may be a permanent magnet generator. However, it should be understood that the generator 320 is not limited to permanent magnet generators, and rather that any generator suitable for powering a wind turbine 10 is within the scope and spirit of the present invention.

In general, the rotor blades 16 may be configured to rotate the rotor 321 of the generator 320. Thus, the generator 320, such as the rotor 321, may be operably connected to the hub 360. Operation of the rotor blades 16 rotates the hub 360, which rotates the rotor 321 and thus operates the generator 320. Thus, a drivetrain 300 for the generator 320 may be provided between the hub 360 and the rotor 321 to provide the operable connection between the hub 360 and the rotor 321.

The hub 360 is rigidly connected to the planet carrier 330. The planet carrier also includes spindle 331. A front bearing 350 and a rear bearing 352 are located between the outer support housing 370 and spindle 331. The bearings 350, 352 may be roller bearings, tapered roller bearings, thrust bearings or any other suitable bearing as desired for the specific application. The outer support housing 370 is secured to the main support frame 340, and functions as a support for the weight of the rotor (including blades 18 and hub 360) as well as the gearbox 310.

The hub 360 may be secured to carrier 330 by any suitable fastening arrangement, including but not limited to a bolted flange connection. Alternatively, the hub and carrier can be formed as a unitary element. As the hub 360 rotates, the carrier 330 drives the planet gears 314. The planet gears interact with the stationary ring gear 312 to drive the sun gear or shaft 316. The sun shaft 316 can then be coupled to the generator rotor 321 by any suitable coupling (e.g., spline fit coupling, bolted flange, etc.).

There are several advantages to this configuration. One of the most expensive components (e.g., the generator or the gearbox) can be reduced in size in a wind turbine. Since the hub is supported directly by the carrier, torsional shear and rotor bending loads are transferred by separate components instead of a single component (i.e. the main shaft). The rotor may be supported by nodular iron instead of alloy steel. This design allows the use of a smaller torque transmission shaft and smaller generator since the torque from the rotor is reduced by the single stage gear box. This design has advantages over a traditional gearbox because the design is tailored for a single stage which should provide higher reliability and less friction loss when compared with a multi stage gear box.

In exemplary embodiments, the planetary gearbox is a single stage planetary gearbox. Thus, the input rotational speed may be converted to the output rotational speed through a single stage of various mating gears. Alternatively, however, the planetary gearbox may be a multiple stage planetary gearbox, and the input rotational speed may be converted to the output rotational speed through multiple stages of various mating gears.

In some exemplary embodiments, the gear teeth in the gearbox may be helical gear teeth. Helical gear teeth are generally gear teeth that are disposed at an angle to an axial centerline through a gear. The helical gear teeth may be configured to offset axial loads on the input shaft. For example, engagement and rotation of the helical gear teeth may generate an axial load generally opposite to the axial load imposed by the rotor (e.g., the blades and hub) of the wind turbine. This gear tooth axial load may operate to offset the rotor axial load and thus reduce the net axial load experienced by the drivetrain. Thus, the stress on various components of the drivetrain that experience or accept portions of the axial load, such as the bearings, may be reduced, and the life of these components prolonged. Additionally or alternatively, the size of the components, such as the forward and rear bearings, may be advantageously reduced due to the reduction in net axial load. The size, angle, and number of helical gear teeth may be configured to generate a desired net axial load for the drivetrain.

It should be understood, however, that the gear teeth 64, 66, 68 need not be helical gear teeth. For example, in some embodiments, the gear teeth 64, 66, 68 may be generally axial with respect to an axial centerline through the respective gears 54, 56, 58.

In exemplary embodiments, the ring gear 54 may drive the planetary gearbox 50. Thus, the ring gear 54 and the input shaft 30 may be in communication such that the input rotational speed of the input shaft 30 is provided to the ring gear 54. Alternatively, however, the planetary gears 56 or the sun gear 58 may drive the planetary gearbox 50. According to aspects of the present invention, wind turbine drive trains have rotor input by a rotating carrier or by a rotating ring gear, which in turn rotates the other components.

The drivetrain 28 of the present disclosure may further include an output shaft 70. The output shaft 70 may be in communication with the planetary gearbox 50 configured to rotate at the output rotational speed. In exemplary embodiments as shown in FIGS. 2 through 5, for example, the output shaft 70 may be the sun gear 58. Thus, the sun gear 58 may engage the planetary gears 56 and may further extend from the planetary gearbox 50 towards the generator 22. In other embodiments, the output shaft 70 may be coupled to the sun gear 58 or other output gear of the planetary gearbox 50 such that the output shaft 70 may rotate at the output rotational speed.

Thus, the drivetrain 200, 300 of the present invention may offset or isolate various loads experienced by the drivetrain during operation of the wind turbine 10. In particular, the drivetrain may offset or isolate axial loads and/or bending loads such that various other components of the drivetrain, such as forward and rear bearings and/or the planetary gearbox, experience less stress and potentially prolonged lifespans.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A drivetrain for a generator in a wind turbine, the drivetrain comprising:
a hub configured to provide an input rotational speed;
a planetary gearbox in communication with the hub, the planetary gearbox comprising a stationary carrier retaining a plurality of rotatable planet gears, the planetary gearbox configured to convert the input rotational speed to an output rotational speed, the planetary gearbox comprising a rotatable ring gear that drives the plurality of rotatable planet gears that drive at least one sun gear;
a spindle on the stationary carrier extending axially forward, the spindle configured to support the hub via one or more bearings; and
wherein, the hub is rigidly connected to the rotatable ring gear, and the stationary carrier is rigidly connected to a main support frame of the wind turbine.

2. The drivetrain of claim 1, wherein at least one of the one or more bearings are located between the spindle and one or more hub supporting members.

3. The drivetrain of claim 1, wherein at least one of the one or more bearings are located between the spindle and a coupling member, the coupling member rigidly attached to the rotatable ring gear and the hub.

4. The drivetrain of claim 1, wherein the planetary gearbox is a single stage planetary gearbox.

5. A drivetrain for a generator in a wind turbine, the drivetrain comprising:
a hub configured to provide an input rotational speed;
a single-stage planetary gearbox in communication with the hub, the single-stage planetary gearbox comprising a rotatable planet carrier rigidly connected to the hub, the single-stage planetary gearbox configured to convert the input rotational speed to an output rotational speed, the planetary gearbox comprising a stationary ring gear, a plurality of planet gears and at least one sun gear;
a spindle of the rotatable planet carrier extending axially rearward, the spindle supported by one or more bearings located between the spindle and an outer support housing;
wherein, the hub is rigidly connected to the rotatable planet carrier, and wherein the rotatable planet carrier supports the plurality of planet gears, and the outer support housing is rigidly mounted on a main support frame of the wind turbine.

6. A wind turbine comprising a drivetrain for a generator, the wind turbine comprising:

a nacelle supported by a tower;

a main support frame attached to the tower, the main support frame configured to support the nacelle;

a hub connected to one or more rotor blades, the hub configured to provide an input rotational speed;

a single-stage planetary gearbox in communication with the hub, the single-stage planetary gearbox comprising a stationary planet carrier and a plurality of planet gears, the single-stage planetary gearbox configured to convert the input rotational speed to an output rotational speed, the single-stage planetary gearbox comprising a ring gear, a plurality of planet gears and at least one sun gear, the ring gear configured to rotate with the hub, the planet carrier further comprising a spindle extending axially forward so that the spindle supports the hub via one or more bearings;

wherein, the hub is rigidly connected to the ring gear, and wherein the stationary planet carrier is rigidly mounted on the main support frame.

7. The wind turbine of claim 6, wherein at least one of the one or more bearings are located between the spindle and one or more hub supporting members.

8. The wind turbine of claim 6, wherein at least one of the one or more bearings are located between the spindle and a coupling member, the coupling member rigidly attached to the ring gear and the hub.

* * * * *